United States Patent
Hiddema

(10) Patent No.: US 8,376,078 B2
(45) Date of Patent: Feb. 19, 2013

(54) AGRICULTURAL APPLICATION MACHINE WITH VARIABLE WIDTH TRACK

(75) Inventor: Joris Hiddema, Grubbenvorst (NL)

(73) Assignee: AGCO Netherlands B.V., Grubbenvorst (NL)

( * ) Notice: Subject to any disclaimer, the term of this patent is extended or adjusted under 35 U.S.C. 154(b) by 81 days.

(21) Appl. No.: 13/059,066

(22) PCT Filed: Aug. 17, 2009

(86) PCT No.: PCT/EP2009/060607
§ 371 (c)(1),
(2), (4) Date: Feb. 15, 2011

(87) PCT Pub. No.: WO2010/020608
PCT Pub. Date: Feb. 25, 2010

(65) Prior Publication Data
US 2011/0133416 A1 Jun. 9, 2011

(30) Foreign Application Priority Data
Aug. 22, 2008 (GB) .................................. 0815314.0

(51) Int. Cl.
*B62D 21/14* (2006.01)
*B60G 3/18* (2006.01)

(52) U.S. Cl. .......... 180/209; 280/124.134; 280/124.135; 280/43.16; 280/638; 180/906

(58) Field of Classification Search ............... 180/24.01, 180/24.02, 24.03, 209; 280/5.514, 6.15, 280/43.16, 638, 124.127, 124.134, 124.135, 280/6.157; 301/124.1, 128, 131, 132
See application file for complete search history.

(56) References Cited

U.S. PATENT DOCUMENTS

| | | | | |
|---|---|---|---|---|
| 1,704,296 A * | 3/1929 | Ledwinka | ..................... | 180/14.4 |
| 3,954,198 A * | 5/1976 | Sedelmayer | ................... | 414/429 |
| 4,449,600 A * | 5/1984 | Telfer | ............................ | 180/437 |
| 5,039,129 A * | 8/1991 | Balmer | ........................ | 180/308 |
| 5,368,121 A * | 11/1994 | Priefert | ......................... | 180/209 |
| 6,036,201 A * | 3/2000 | Pond et al. | ................ | 280/5.514 |
| 6,145,610 A * | 11/2000 | Gallignani | .................. | 180/9.48 |
| 6,206,125 B1 | 3/2001 | Weddle | | |
| 6,406,043 B1 * | 6/2002 | Balmer | ..................... | 280/124.1 |
| 7,163,227 B1 | 1/2007 | Burns | | |
| 7,387,314 B2 * | 6/2008 | White | .......................... | 280/781 |
| 2005/0189730 A1 * | 9/2005 | White | ........................ | 280/6.154 |
| 2007/0201780 A1 | 8/2007 | Connell et al. | | |

FOREIGN PATENT DOCUMENTS

| | | |
|---|---|---|
| DE | 2713979 A | 1/1978 |
| EP | 0501585 A1 | 9/1992 |
| EP | 2058154 A1 | 5/2009 |
| WO | WO 2004024541 A1 * | 3/2004 |

OTHER PUBLICATIONS

Bearing Block Definition, free dictionary, available at, http://encyclopedia2.thefreedictionary.com/bearing+block (last visited Jul. 6, 2012).*

(Continued)

*Primary Examiner* — Joseph Rocca

(57) ABSTRACT

An agricultural application machine (10) comprising a pair of wheels (11, 12) each having an associated wheel support structure (22) is provided. Each wheel support structure is mounted to the chassis (60) by a transversely extending support shaft (29; 49) which is slidably mounted within a bearing block (50; 80). The provision of bearing blocks allows the transverse separation of the wheels to be varied with minimal sliding friction.

18 Claims, 10 Drawing Sheets

OTHER PUBLICATIONS

Integrated Definition, at Dictionary.com, available at http://dictionary.reference.com/browse/integrated?r=66 last visited (Jul. 6, 2012).*

UK Search Report Serial No. GB0815314.0 dated Dec. 18, 2008.
PCT Search Report PCT/EP2009/060607 dated Feb. 12, 2009.

* cited by examiner

AGRICULTURAL APPLICATION MACHINE WITH VARIABLE WIDTH TRACK

The invention relates to an agricultural application machine such as self-propelled crop sprayer wherein the track defined by the separation of opposing wheels within a pair has a variable width.

Agricultural application machines such as crop sprayers comprise a large volume tank carried on a chassis. Such machines can be trailed behind a tractor or provided as a self-propelled unit having an integral cab and engine. The machine further comprises an extending boom which provides a transverse line of uniformly spaced spray nozzles connected by pipes to the tank. During operation the application machine is moved across fields of crops such as cereals and maize to apply liquid fertilizer or chemical treatment such as herbicides, fungicides and pesticides to the crop in a controlled manner.

Throughout the growing season crops typically require multiple applications by such a machine. For example, in one pass liquid fertilizer may be applied whereas in a later pass a pesticide treatment may be applied. For small and medium farms in particular a contractor is often employed to make such applications to the crop. This can result in a number of different contractors with different application machines being used at different times for a given crop.

An application machine usually operates over tramlines within a crop field wherein the same footprint is driven on by the machine wheels a number of times for multiple applications throughout the growing season. This minimizes the area of the field which cannot be used for growing a profitable crop and is a well established method of farming.

In the case where one application machine of fixed track width is required to make an application to a field having tram lines of different track width, then a second set of tram lines, albeit partly overlapping with the first set, will be made resulting in further damage to the crop and thus reducing output.

Application machines having variable track width, therefore, provide greater flexibility in choice of machine and ultimately contractor employed.

It is an object of the invention to provide and agricultural application machine having an improved mechanism to vary the track width in a simple yet effective manner.

According to the invention there is provided an agricultural application machine comprising a pair of wheels each having an associated wheel support structure mounted to the chassis by a transversely extending support shaft which is slidably mounted for axial displacement within a bearing block to allow for the transverse separation of the wheels to be varied. By mounting each wheel to the chassis by a shaft which is slideable within a bearing block, the track width can be adjusted in a simple manner with minimal frictional resistance.

During adjustment of the track width the sliding friction is only exerted between the bearing block sleeve and the transverse support shaft. Using known bearing technology this sliding friction is significantly reduced as compared to existing mechanisms to vary the track width of an application machine. Furthermore, the simplicity of the components required to implement the invention delivers a reduction in cost in ease of both assembly and maintenance.

In a first preferred embodiment each respective bearing block is fixed relative to the associated wheel support structure and the support shafts are fixed relative to the chassis. To reduce the number of parts involved and hence the cost, the bearing blocks can be mounted on respective ends of a single shaft supported in the centre by the chassis.

Preferably wheels of a respective pair share transversely extending shafts.

In a second preferred embodiment the bearing blocks are fixed relative to the chassis and each respective support shaft is fixed to the associated wheel support structure.

To assist in varying the transverse separation of the wheels the application machine may further comprise a respective hydraulic actuator connected between each wheel support structure and the chassis to apply a force therebetween to assist in varying the transverse separation of the wheels in response to an applied hydraulic signal. Further assistance may be provided by arranging steerable pairs of wheels to 'track in' or 'track out' thus adjusting the track width by simply driving the vehicle forwards or backwards.

In the case where the bearing blocks are fixed relative to the chassis each hydraulic actuator may comprise a cylinder having two chambers separated by a piston head which is connected to the support shaft. Advantageously, the support shaft itself is provided by the piston rod of the hydraulic cylinder which serves to adjust the track width thereby reducing the number of parts and saving on cost. Preferably, each bearing block is integrated with the associated cylinder thereby providing a single module which serves to adjust the track width and bear the loading of the associated wheel.

To further reduce the number of parts involved the respective cylinders associated with a pair of wheels can be formed and mutually aligned within a single module mounted to the chassis. Therefore, the module houses two hydraulic cylinders and two piston heads which act along the same axis to adjust the track width.

The invention lends itself well to an application machine having a relatively narrow longitudinal chassis which is positioned centrally. This allows opposing bearing blocks to be positioned close to the central axis of the vehicle thus delivering a minimum track width whilst also increasing the available steering angle thus reducing the turning circle when implemented on a self-propelled machine.

Preferably further still each wheel support structure is mounted to the chassis by a pair of transversely extending support shafts which are each slidably mounted within a respective bearing block. The provision of a pair of support shafts for each wheel not only distributes the wheel loading over two points but provides a more rigid structure. Each pair of support shafts blocks may be horizontally spaced or vertically spaced.

Each support shaft preferably comprises a stop block at each end to prevent the bearing blocks from sliding off the shaft.

Preferably, each support shaft is formed of steel and the bearing block comprises a steel body with a bronze lined sleeve which cooperates with the associated support shaft. Advantageously, this material combination delivers a minimal co-efficient of friction thus improving the mechanism to adjust the track width. Alternatively, the bearing blocks could be formed of plastic.

Further advantages of the invention will become apparent from the following description of the specific embodiments with reference to the appended drawings in which—

Figure 1:
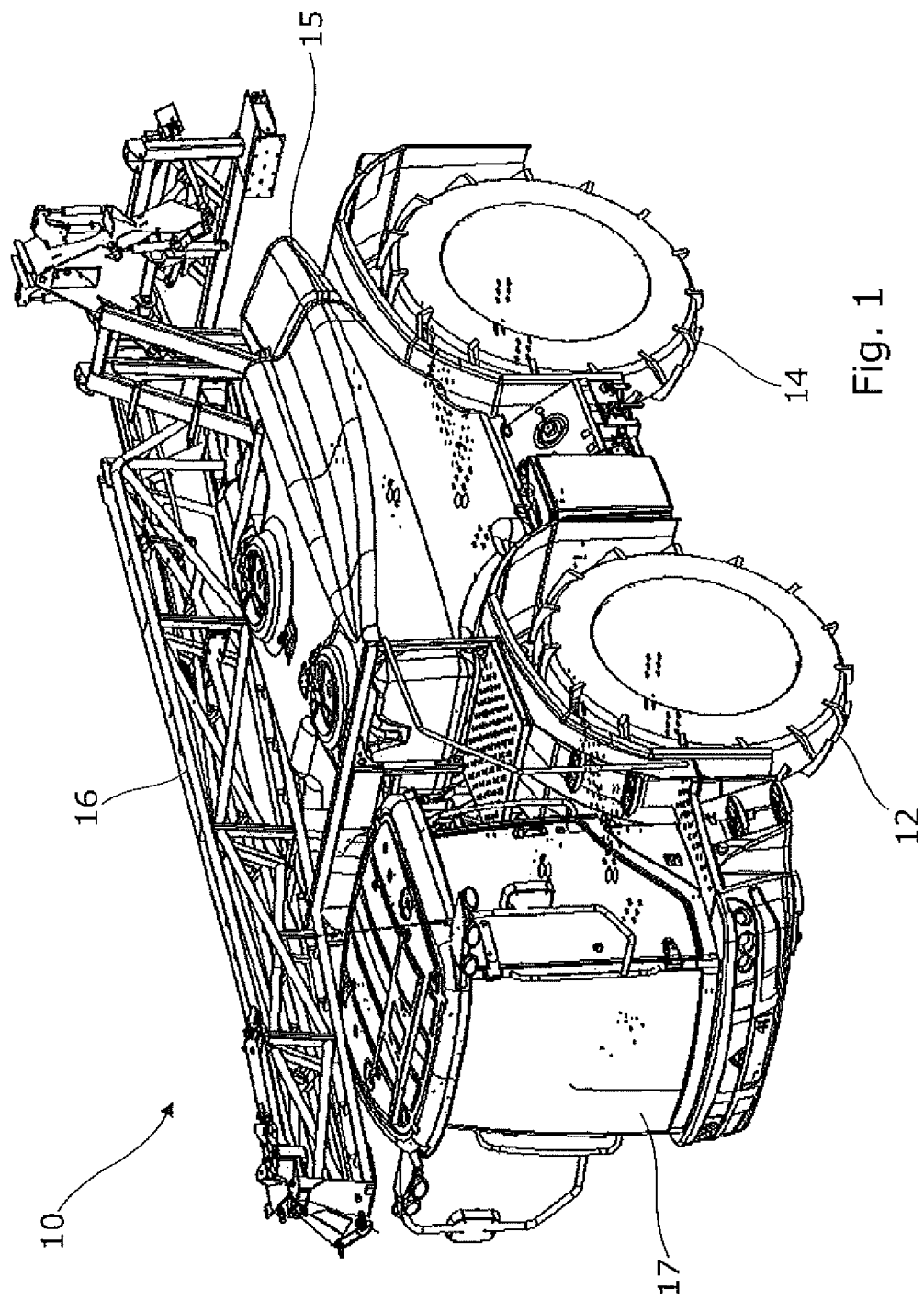
FIG. 1 is a perspective view of a self-propelled agricultural sprayer.
Figure 2:
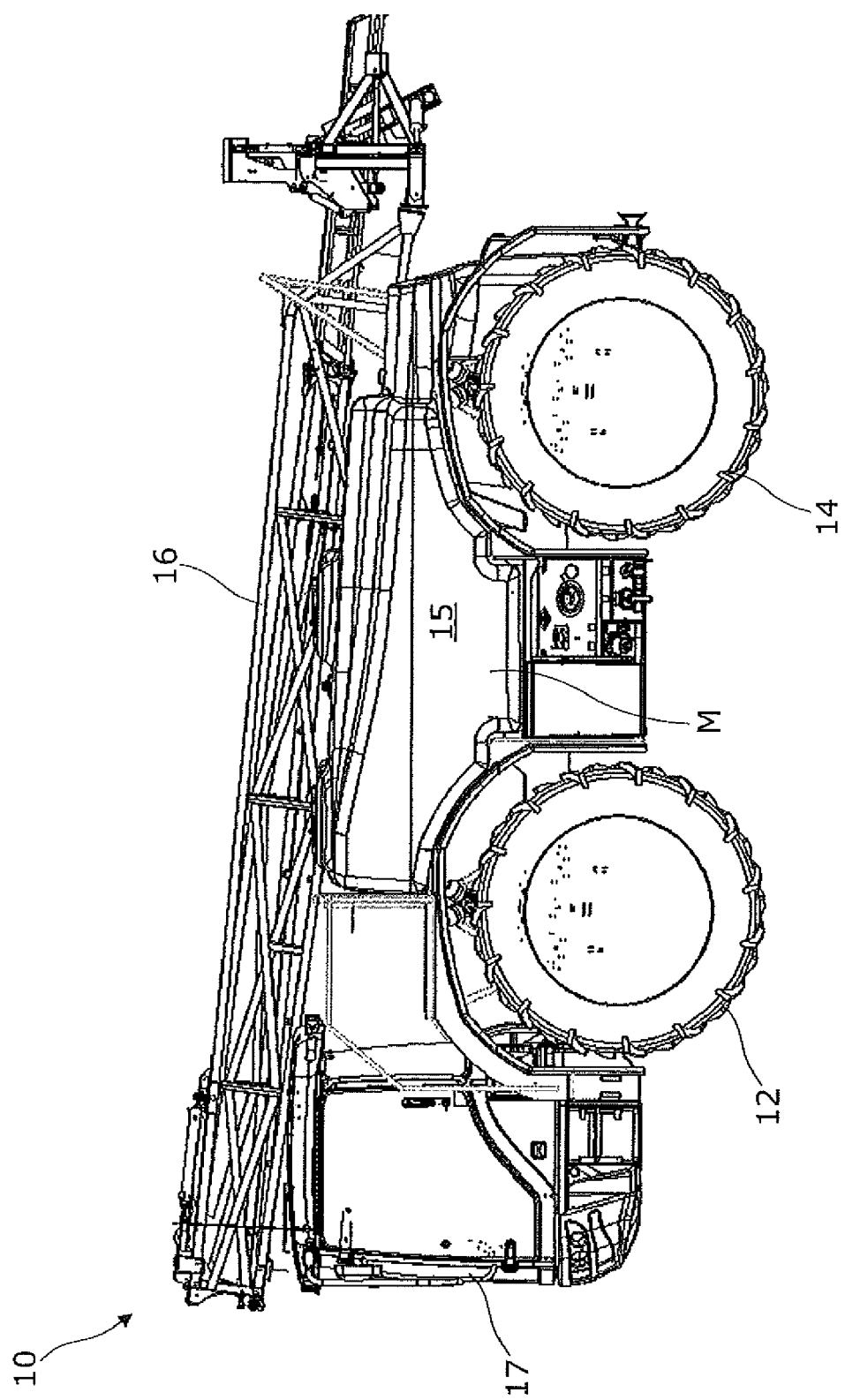
FIG. 2 is a side view of the sprayer of FIG. 1.
Figure 12:
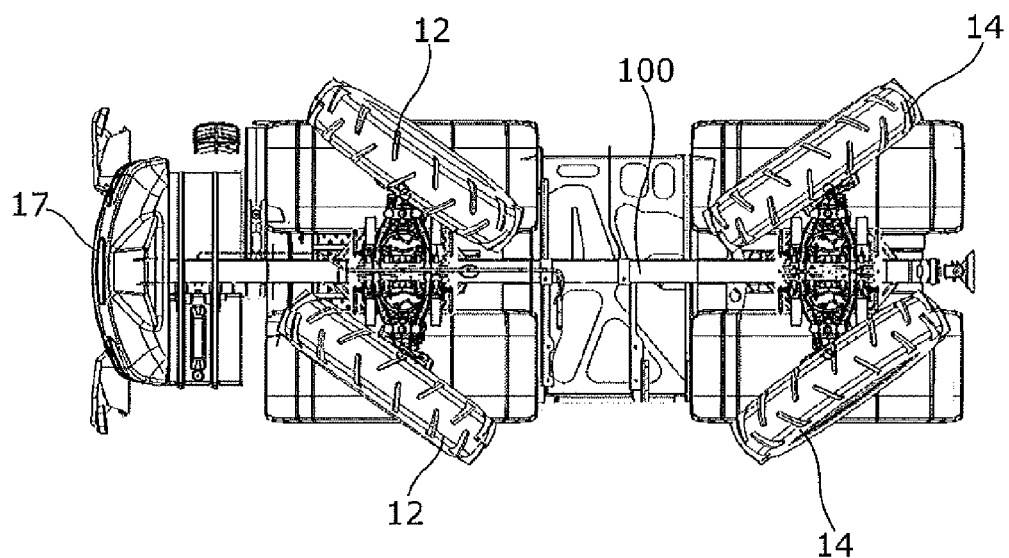
FIG. 12 is an underside view of the sprayer of FIG. 1.

With reference to FIGS. 1, 2 and 12, a self-propelled arable crop sprayer 10 comprises a pair of front wheels 12 and pair of rear wheels 14 each wheel being separately mounted to a chassis 100 by respective variable height suspension means. The sprayer 10 further comprises a tank 15, a boom assembly 16 and driver's cab 17. The tank 15 accounts for the majority of the sprayer's volume and serves to hold the liquid material which is to be applied to a field. By way of example, the liquid material may comprise fertilizer or other chemical treatment such as herbicides, fungicides, pesticides or growth restrictors.

The liquid material is delivered in a controlled manner to spray nozzles (not shown) located on the boom assembly 16 by a network of supply pipes (not shown). In the transport mode (shown in FIGS. 1 and 2) the boom assembly 16 is retracted so as to remain substantially within the profile of the vehicle body thus allowing safe movement on the highway. In an operating mode the boom assembly 16 is extended so as to provide a transversely extending boom, having a width of 24 meters for example. Driven across an arable field, the liquid material is sprayed onto the crop in strips 24 meters wide at a time. The driver located in cab 17 controls the steering of the sprayer and the control of the liquid material application. It should be understood that FIGS. 1 and 2 show only one half (right-hand side) of the folded boom assembly 16.

The weight of a fully laden tank 15 accounts for a significant proportion of the overall vehicle weight. Therefore, the centre of mass of the sprayer 10 is located within the volume of the tank 15 as referenced at M in FIG. 2. To maximize the stability of the sprayer 10 it is desirable to minimize the height of the centre of mass M above the ground. The requirement to avoid crop damage caused by the underside of the sprayer 10 dictates that the chassis 100 should be raised at least during operation on the field. Therefore variable height suspension means are provided to adjust the ground clearance of the underside of the sprayer 10.

With reference to FIGS. 3 to 9, each wheel 12, 14 has an associated wheel carrier 18 comprising a carrier element 19 and a wheel hub 20 rotatably mounted to the carrier element 19. The associated wheel 12 (FIG. 5) is bolted to the respective wheel hub 20, rotation of which is driven by a hydrostatic motor 21 which is mounted to the respective carrier element 19.

Each wheel carrier 18 is mounted to a respective wheel support structure 22 by an upper arm 23 and a lower arm 24, altogether forming a unit termed hereinafter a 'corner module'. The wheel support structure 22 for each corner module is a cast unit which is, in this embodiment, attached to the chassis 100 by a track varying mechanism which allows the track width, that is the distance between wheels within a respective pair, to be changed. The track varying mechanism in accordance with the invention will be described in more detail below. The wheel support structure 22 is mounted so as to maintain a constant height relative to the chassis 100.

Figure 6:
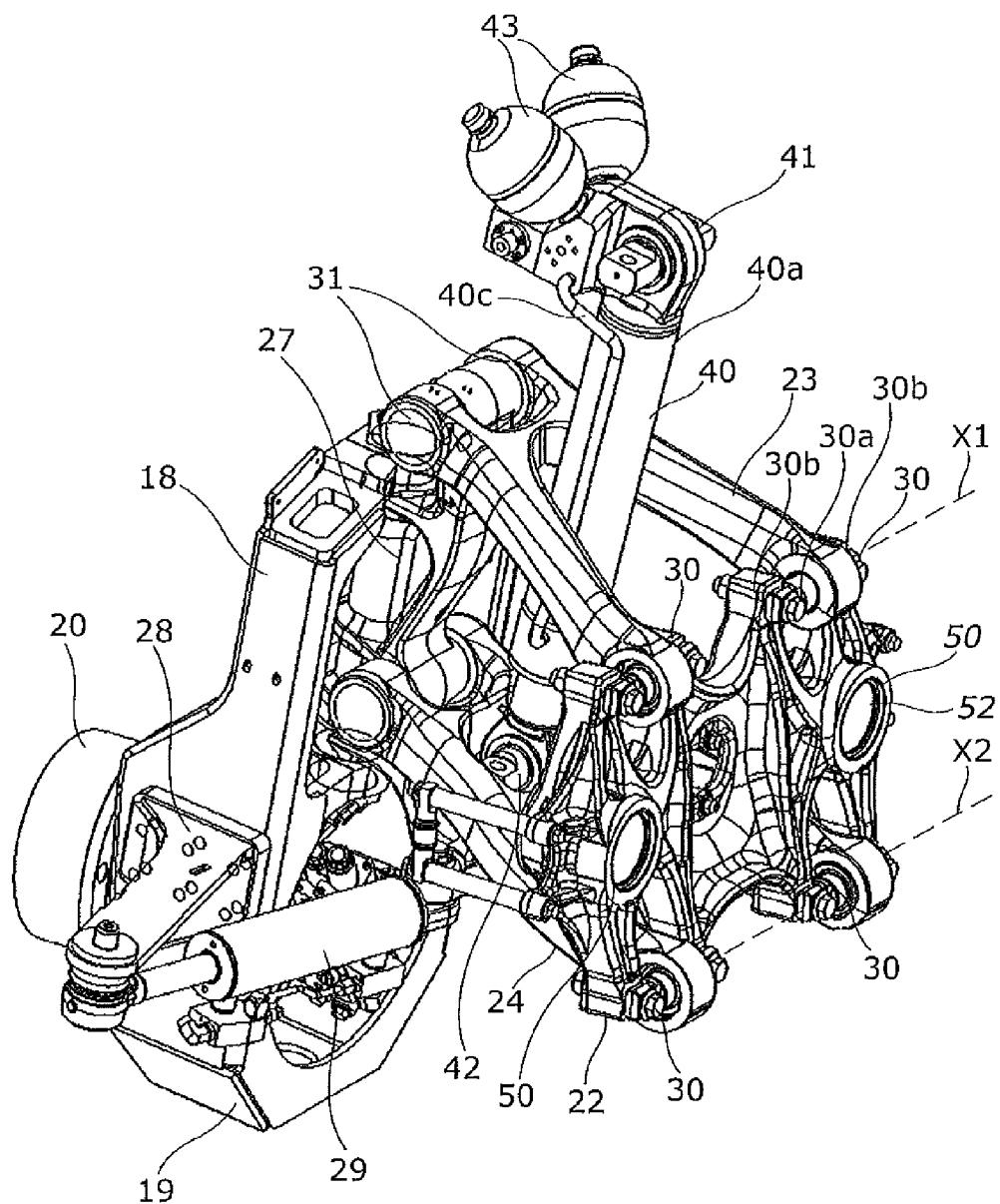
FIG. 6 is a perspective view of a wheel suspension assembly for one wheel of the sprayer of FIG. 1 and in accordance with the first embodiment of the invention.
Figure 7:
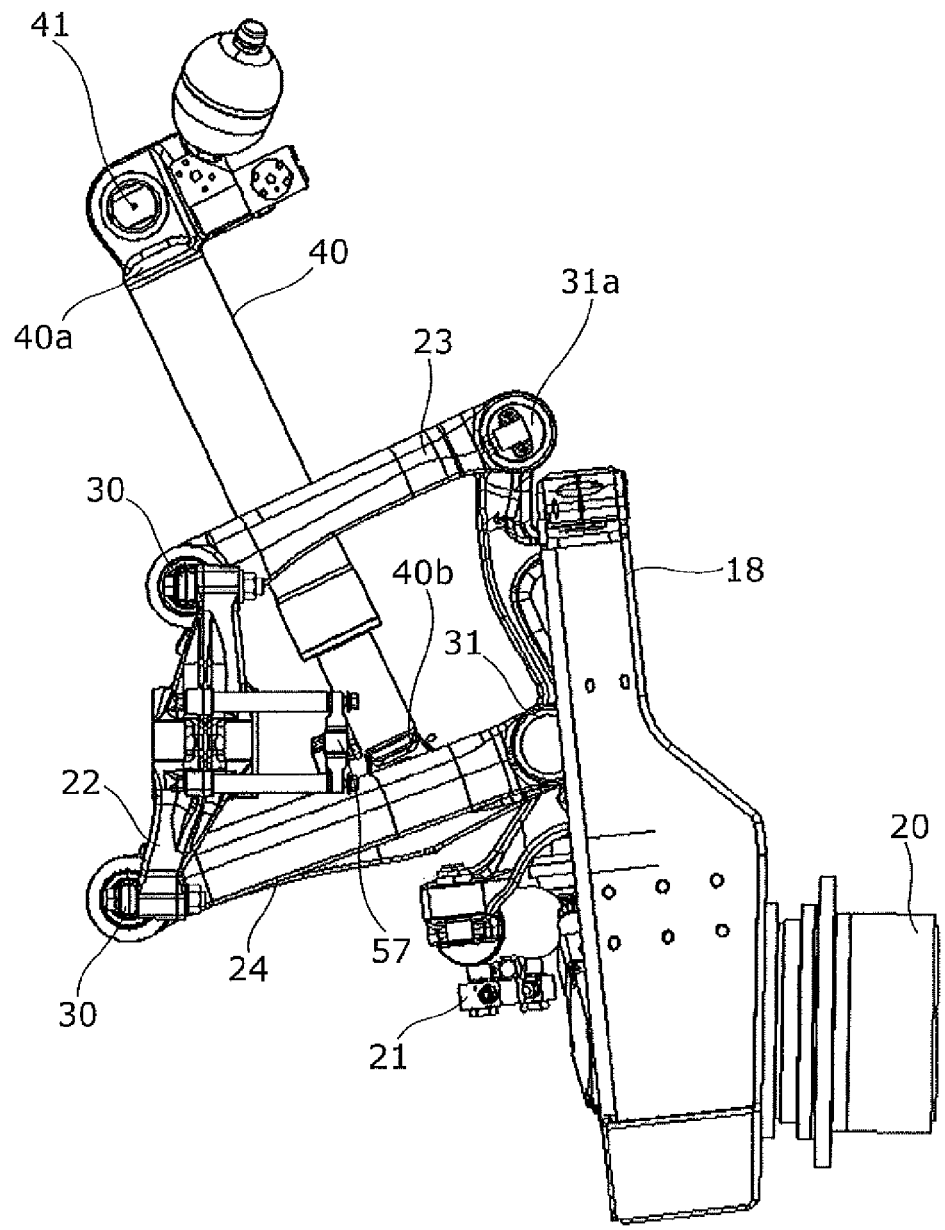
FIG. 7 is a rear elevation view of the wheel suspension assembly of FIG. 6.
Figures 8, 9:
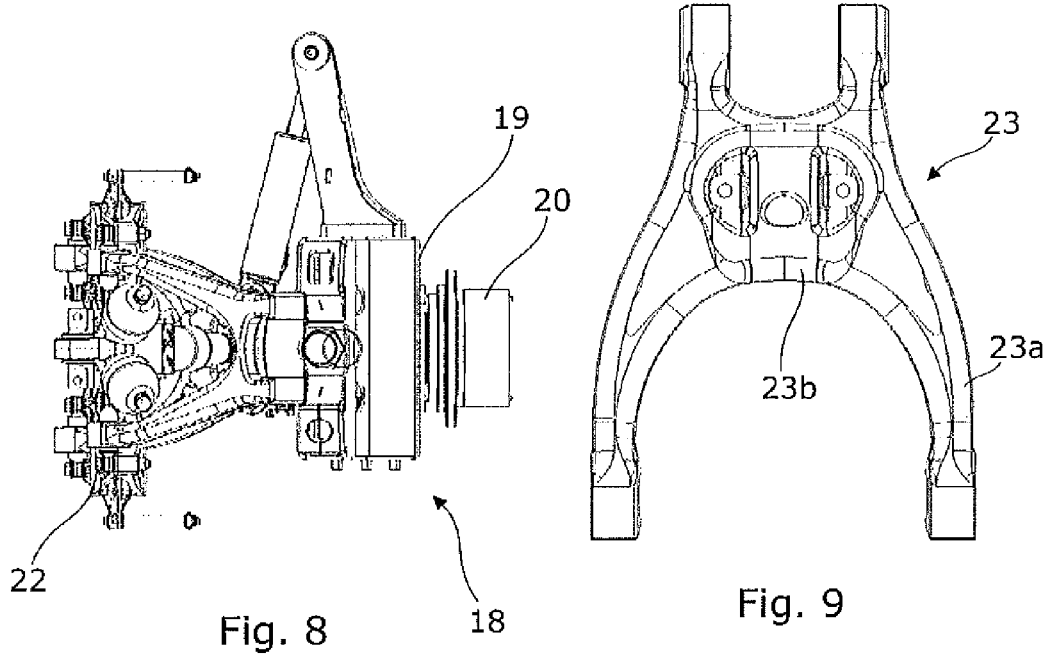
FIG. 8 is a plan view of the wheel suspension assembly of FIG. 6.
FIG. 9 is a plan view of an upper arm forming part of the wheel suspension assembly of FIG. 6.
Figure 10:
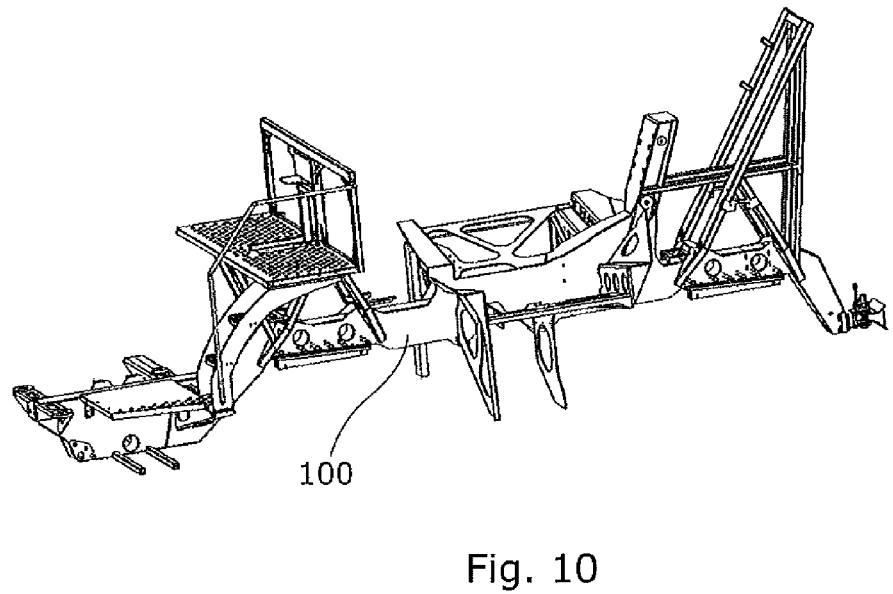
FIG. 10 is a perspective view of the chassis of the sprayer of FIG. 1.

All four wheels 12, 14 are steerable. However, it should be appreciated that a self-propelled vehicle may be provided with only two-wheel steering. To enable steering, each carrier element 19 is pivotally mounted to an upright king pin 27 which forms part of the wheel carrier 18 as shown in FIG. 6. Welded to one side of each carrier element 19 is a steering lever 28 in the form of a bracket. At the end remote the carrier element 19 a steering cylinder 29 is pivotally connected to the steering lever 28. The other end of the steering cylinder 29 is secured relative to the wheel carrier 18. Pressurise fluid supplied to each of the steering cylinders 29 controls the steering of the associated wheel.

For each of the four corner modules, each of the upper arm 23 (FIG. 9) and lower arm 24 have an H-shaped construction having a pair of transverse extensions 23a connected by a longitudinally (relative to the normal direction of vehicle travel) extending tie 23b. Each arm 23, 24 is pivotally connected to the wheel support structure 22 by a respective pair of pivotal joints 30 which allow pivotal movement of the arms about a longitudinal axis, X1, X2 (FIG. 6). Each joint 30 comprises a pin 30a which retains the associated arm extension 23a between a respective pair of jaw elements 30b provided by the associated wheel support structure.

At the opposite (outside) end of each arm 23, 24 a respective pair of pivotal joints 31 connect each arm to the wheel carrier 18. In the embodiment shown, the outer joints 31 for each arm 23, 24, share a common pin 31a to retain the associated wheel carrier 18 although separate pins may be employed instead. In accordance with the invention, the upper arm 23, lower arm 24, wheel carrier 18 and wheel support structure 22 connected at the respective pivoting joints 30, 31 provide a four-bar linkage arrangement which allows movement of the arms 23,24 and the carrier 18 in a plane which is substantially vertical and transverse to the longitudinal axis of the machine 10. By a pivoting motion of the arms 23,24 the ground clearance of the chassis can be adjusted over a large range.

The unequal lengths of the upper and lower arms 23,24 are chosen to minimize the variation in transverse separation between the base of the wheel and the chassis as discussed in more detail below.

A hydraulic cylinder 40 is provided for each of the suspension units to adjust the height of each wheel 12, 14 relative to the chassis 100. A first upper end 40a of each hydraulic cylinder 40 is fixed relative to the associated wheel support structure 22 by means of a pivoting link supported on a pin 41. In this case, the upper end 40a is fixed relative to the associated wheel support structure 22 by an appropriate attachment point 101 on the chassis 100. A second lower end 40b of each cylinder 40 is pivotally connected to the associated lower arm 24 by a joint 42. Each cylinder 40 has connected thereto fluid pipes 40c which deliver a supply of oil to the cylinder chambers so as to control movement of the piston located therein.

A pair of accumulators 43 are provided for each cylinder 40 to provide a spring function which damps vibrations transmitted from the wheels to improve the comfort for the driver and reduce the effect of the vibrations on the boom assembly 16.

In response to an appropriate hydraulic signal applied to the cylinders 40, the four-bar linkage arrangement attached thereto is moved thus adjusting the height of the chassis 100 above the ground. The cylinder 40 controls movement of the four bar linkage over the entire range of available heights from a fully raised position to a fully lowered position.

It should be appreciated that each wheel carrier is raised and lowered as a single unit. Therefore, the carrier element 19, king pin 27 and steering cylinder 29 move up and down in unison.

Figure 11:
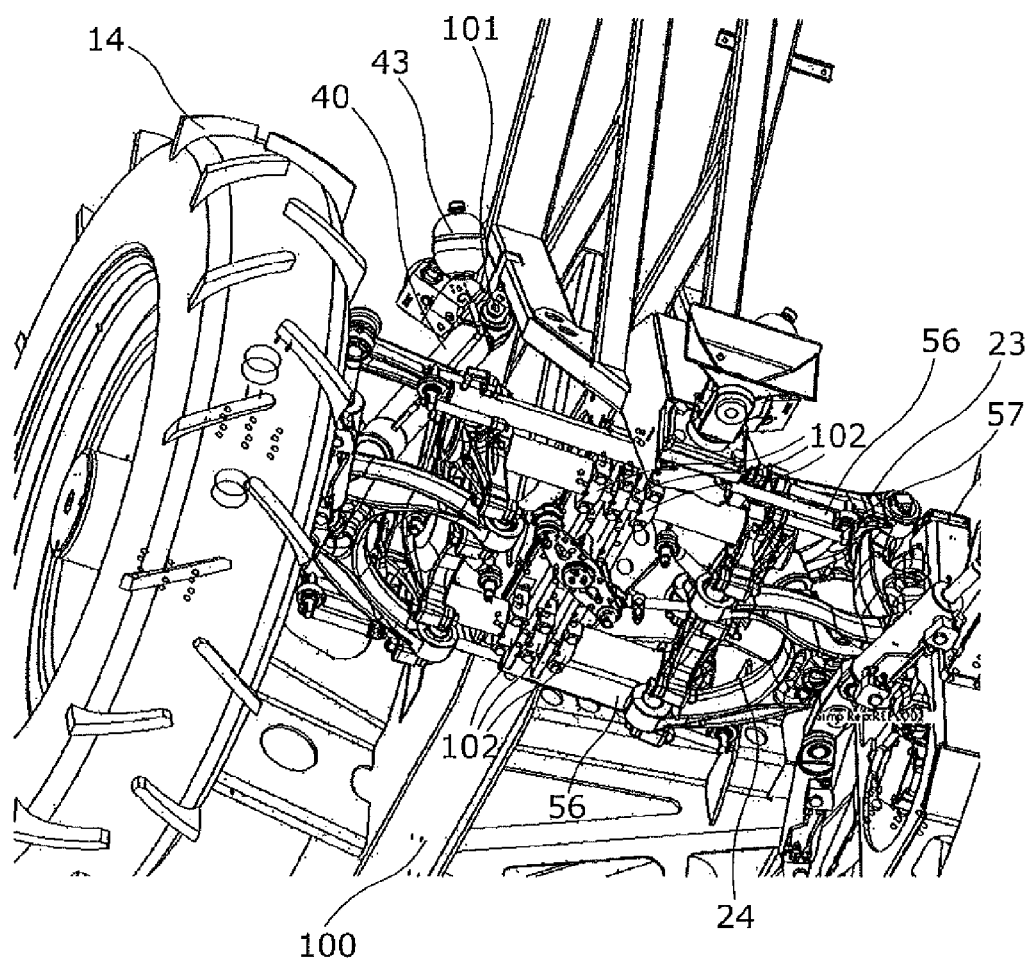
FIG. 11 is a perspective view of the rear part of the underside of the sprayer of FIG. 1.

Turning back to the construction of the corner modules, and particularly to the aforementioned variable track mechanism, each wheel support structure 22 includes a pair of bearing blocks 50 which are cast therein. Each bearing block 50 comprises a transversely extending bronze-lined sleeve 52 which receives a respective transversely extending shaft 54 which is secured by a series of brackets 102 bolted to the underside of the chassis 100 (FIG. 11). Each wheel support structure 22 is slidably mounted on a pair of transversely extending shafts 54 so that the wheel track of the vehicle can be varied as required. As can be seen from FIGS. 3 to 5, each pair of wheels 12, 14 shares a pair of mounting shafts 54. The provision of a pair of horizontally spaced support shafts 54 delivers a sturdy support for the wheel assemblies.

Figure 4:
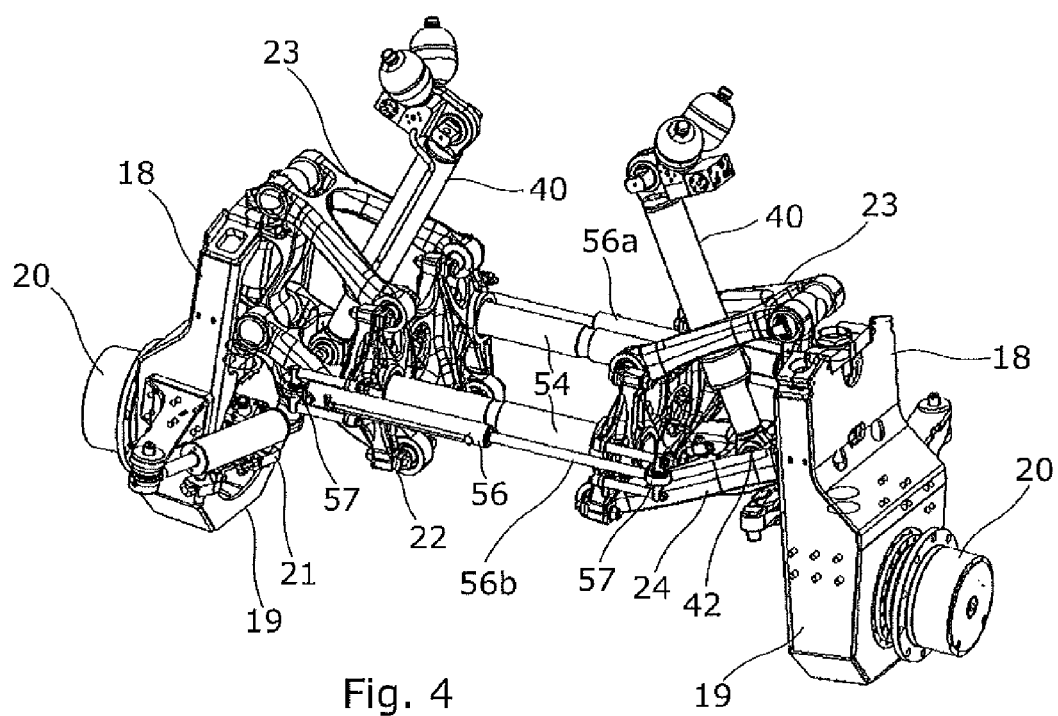
FIG. 4 is a perspective view of the wheel suspension assembly of FIG. 3 shown at a maximum track width.
Figure 5:
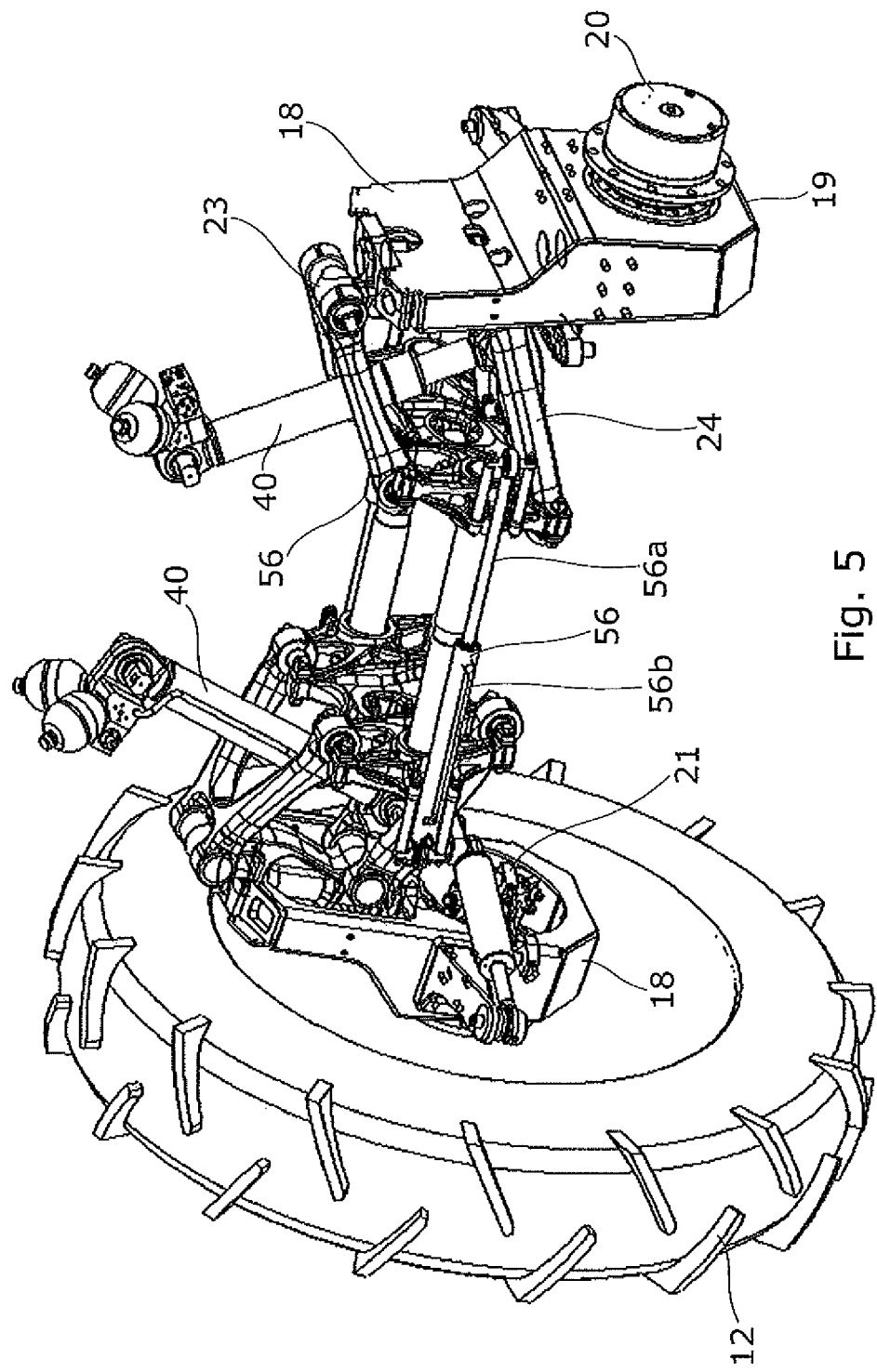
FIG. 5 is a perspective view of the wheel suspension assembly of FIG. 3 shown with one wheel attached.

To control the track width, each pair of wheels 12, 14 has associated therewith a pair of hydraulic actuators 56. As can be seen in FIG. 4 for example, the actuators are each connected between mounting pins 57 provided on transversely opposing wheel support structures 22, one disposed forwardly of the front-most shaft 54 and the other disposed rearwardly of the rear-most shaft 54. Each actuator 56 comprises a piston (not shown) slidably contained within a cylinder 56a. A piston rod 56b is connected to the piston. The two actuators 56 associated with a given pair of wheels are mechanically connected in an opposing parallel relationship wherein the piston rod 56b of one actuator is connected to the left-hand wheel support structure 22 and the piston rod 56b of the other actuator is connected to the right-hand wheel support structure 22.

Pressurised fluid is supplied to the actuators 56 so as to control the separation of the wheel support structures 22 and thus the track width of the vehicle. It may be necessary to ensure the vehicle is moving in order to effect smooth adjustment of the track width without subjecting the corner modules to unnecessary transverse strain.

Figure 3:
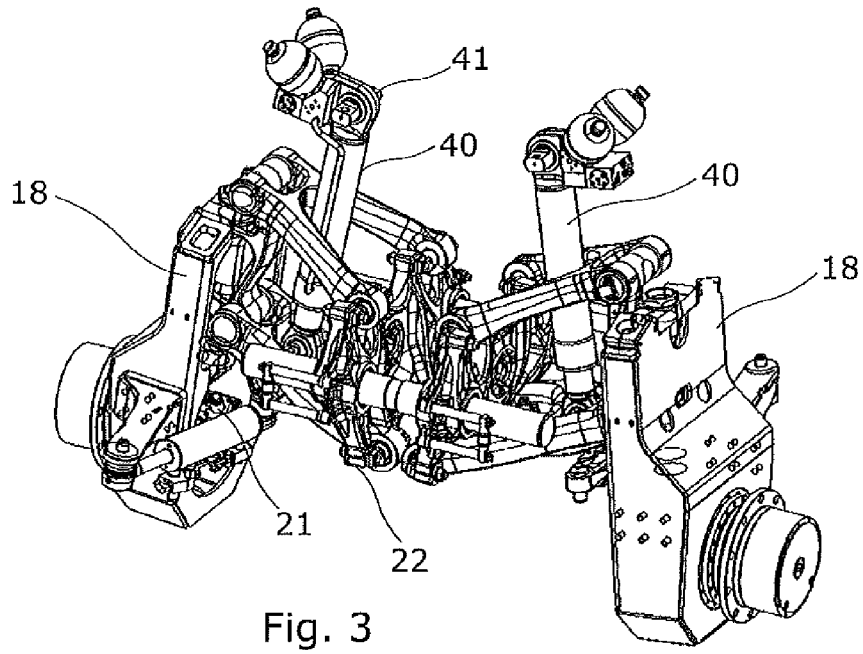
FIG. 3 is a perspective view of a wheel suspension assembly for a pair of wheels of the sprayer of FIG. 1 mounted to the chassis in accordance with a first embodiment of the invention and shown at a minimum track width.

The track width of the sprayer is adjustable continuously between a minimum track width as shown in FIG. 3 to a maximum track width as shown in FIG. 4. Advantageously, this allows the sprayer to be employed over existing tram lines of any width within the available range. This is particularly beneficial for contractors who work on a number of different farms.

The variable track mechanism of the present invention lends itself well to be implemented in combination with variable height suspension means as described. Therefore not only can the sprayer 10 operate over tram lines of various widths but can also operate at different ground clearances as required by the crop height and the incline of the field for example. However, it is envisaged that the variable track mechanism can be implemented on a machine having fixed height suspension without deviating from the scope of the invention.

Although the above described embodiment comprises support shafts 54 that are shared by opposing wheels, it is envisaged that each wheel support structure 22 can instead be mounted to respective support shafts 54. Similarly, each corner unit may have a dedicated actuator connected to the chassis to effect varying of the track width. Furthermore, it is envisaged that each wheel support structure 22 may have affixed thereto any practical number of bearing blocks each slidably mounted on a support shaft without deviating from the scope of the invention.

Figure 13:
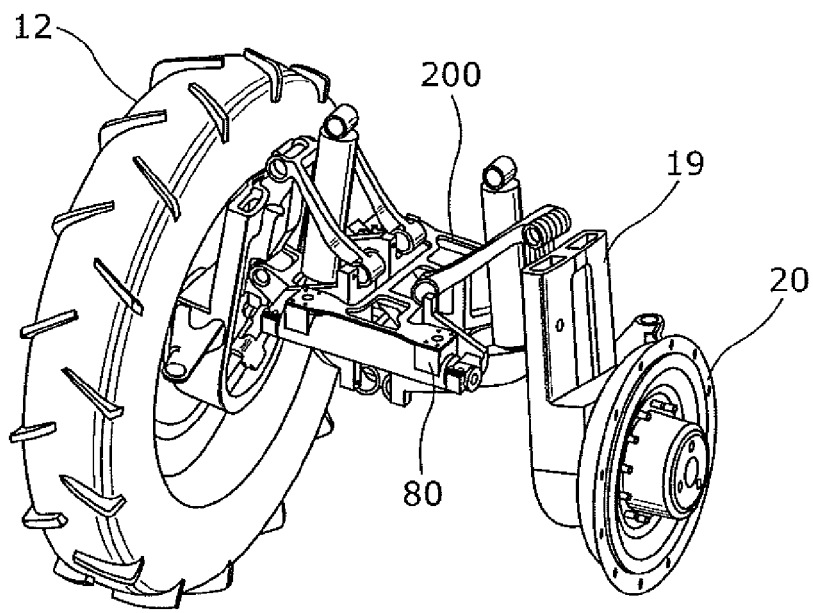
FIG. 13 is a perspective view of a wheel suspension assembly for a pair of wheels mounted to the chassis in accordance with a second embodiment of the invention and shown at a minimum track width.
Figure 14:
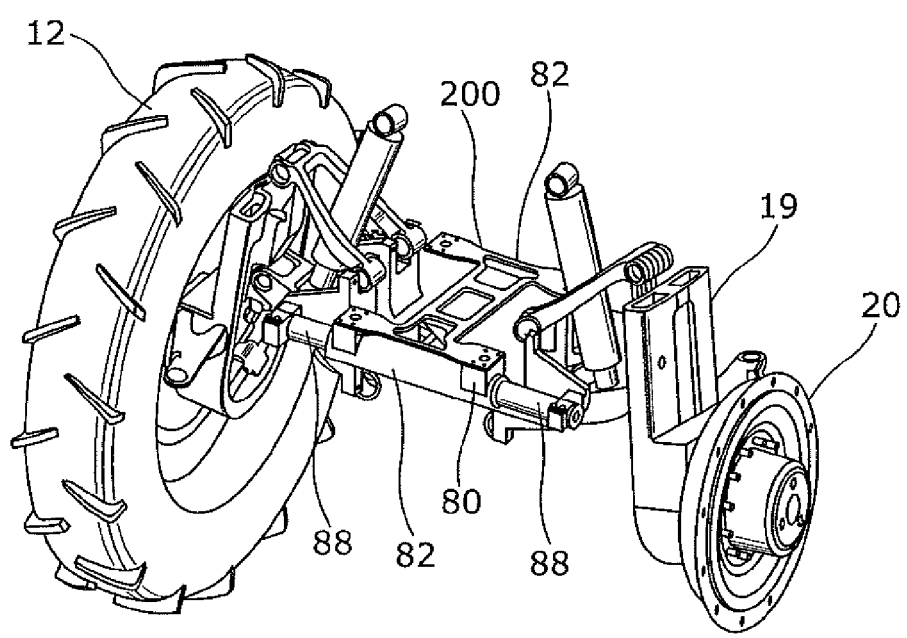
FIG. 14 is a perspective view of the wheel suspension assembly of FIG. 13 shown at a maximum track width; and, FIG. 15 is a sectional view of an integral hydraulic actuator and bearing block unit in accordance with the second embodiment of the invention.

With reference to FIGS. 13 and 14, in a second embodiment, bearing blocks 80 are fixed relative to the chassis 200 and each respective support shaft 49 is fixed to the associated wheel support structure 22. The front pair of wheels, illustrated in FIGS. 13 and 14 with one wheel removed for sake of easy explanation, have a track width which is varied by means of a pair of actuating modules 82 bolted or welded to a chassis 200.

It will be appreciated that the variable width mechanism of the rear pair of wheels is very similar, if not identical, to that described hereinafter with respect to the front pair of wheels.

Figure 15:
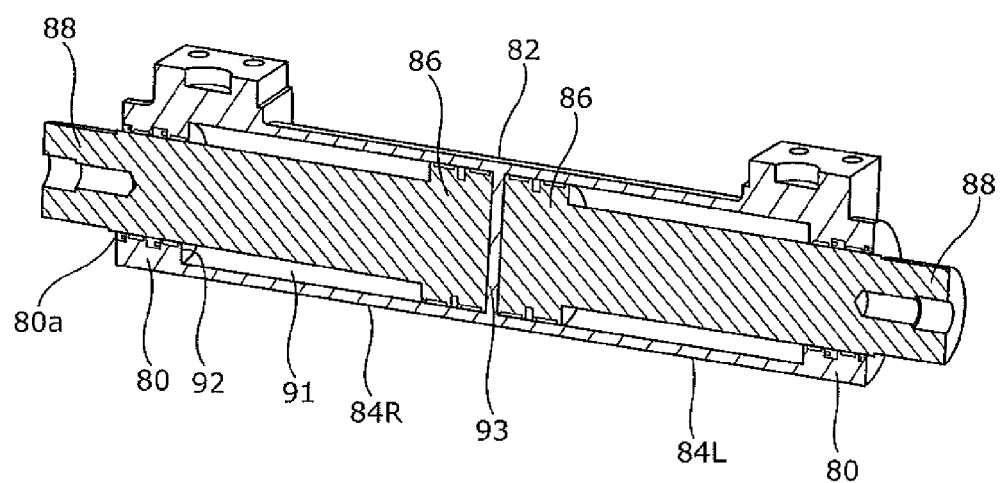

Each module 82 comprises a pair of axially aligned hydraulic cylinders 84L and 84R each serving one respective wheel unit as shown in FIG. 15. Each cylinder 84L, 84R encloses a respective piston head 86 which is slideable therein and attached to one end of the associated support shaft 88 remote the end attached to the wheel support structure 22. FIG. 15 shows both pistons 86 in a fully retracted position corresponding to a minimum track width (FIG. 13).

Each piston head 86 separates two chambers either side thereof; a first chamber 91 between the piston 86 and the end wall 92, and a second chamber between the piston 86 and a central dividing wall 93 which itself separates the two cylinders 84L, 84R. By means of hydraulic lines and valves (not shown) connected to openings in each chamber, an applied hydraulic pressure forces the respective piston away from the greatest pressure and thus moves the support shaft 88 connected thereto. Therefore, the track width can be controlled hydraulically.

As well as providing a seal, the end wall of each cylinder nearest to the associated wheel comprises an integrated bearing block 80, each comprising a plastic-lined sleeve 80a which reduces the frictional coefficient with the steel support shaft 88 slideable therein. Furthermore, each piston head 86 includes a sliding bearing around its periphery as it too bears a proportion of the wheel loading.

Although the embodiment shown in FIGS. 13 to 15 comprises an integral double-cylinder module 82, it is envisaged that physically separate cylinders with bearing blocks could instead be employed for each respective support shaft 88 to facilitate the variable track width in accordance with the invention. Alternatively, the bearing blocks could be physically separate from the hydraulic cylinders.

In an embodiment not illustrated in the drawings, the support shafts and hydraulic actuators could be physically separate entities whilst keeping the bearing blocks secured to the chassis or frame.

In summary, there is provided an agricultural application machine comprising a pair of wheels each having an associated wheel support structure. Each wheel support structure is mounted to the chassis by a transversely extending support shaft which is slidably mounted within a bearing block. The provision of bearing blocks allows the transverse separation of the wheels to be varied with minimal sliding friction.

From reading the present disclosure, other modification will be apparent to persons skilled in the art. Such modifications may involve other features which are already known in the field of agricultural application machines and component parts therefore and which may be used instead of or in addition to features already described herein.

The invention claimed is:

1. An agricultural application machine comprising:
a chassis;
a pair of wheels each suspended from a respective wheel support structure; and
a pair of transversely extending support shafts fixed relative to the chassis;
each wheel support structure comprising a pair of spaced bearing blocks which are slidably mounted for axial displacement on the support shafts to allow for the transverse separation of the wheels to be varied; wherein the support shafts are configured to pass through the respective wheel support structures, such that in a narrow transverse wheel separation position the support shafts pass through the respective wheel support structures and extends laterally outside of the respective wheel support structures.

2. An agricultural application machine according to claim 1, further comprising a respective hydraulic actuator connected between each wheel support structure and the chassis to apply a force therebetween to assist in varying the transverse separation of the wheels in response to an applied hydraulic signal.

3. An agricultural application machine according to claim 1, further comprising a hydraulic actuator connected between the pair of wheel support structures to apply a force therebetween to assist in varying the transverse separation of the wheels in response to an applied hydraulic signal.

4. An agricultural application machine according to claim 3, comprising a pair of hydraulic actuators each connected between the pair of wheel support structures.

5. An agricultural application machine according to claim 1, wherein said pair of support shafts are horizontally spaced.

6. An agricultural application machine according to claim 1, wherein said pair of support shafts are vertically spaced.

7. An agricultural application machine according to claim 1, wherein each support shaft comprises a stop block at one end to prevent the support shaft from sliding completely through the respective bearing block.

8. An agricultural application machine according to claim 1, wherein:
each support shaft is formed of steel; and,
the bearing block comprises a steel body with a plastic-lined sleeve which cooperates with the associated support shaft.

9. An agricultural application machine according to claim 1, wherein the chassis comprises a single longitudinal beam.

10. An agricultural application machine according to claim 1, wherein the machine is self-propelled.

11. An agricultural application machine according to claim 1, wherein the support shafts have a circular cross section along their length.

12. An agricultural application machine according to claim 1, further comprising:
a respective wheel carrier suspended from each of the wheel support structures by a four-bar linkage arrangement each comprising an upper and a lower arm; and
each wheel being mounted to a respective one of said wheel carriers.

13. An agricultural application machine according to claim 12, further comprising for each wheel a respective height adjustment actuator connected between a point fixed relative to the chassis and the lower arm, wherein the length of the actuator is varied to adjust the height of the chassis above the ground.

14. An agricultural application machine comprising:
a chassis;
a pair of wheels each suspended from a respective wheel support structure which is attached to a respective pair of transversely extending support shafts;
a pair of actuating modules fixed to said chassis, each respective actuating module comprising two axially aligned hydraulic cylinders each hydraulic cylinder having an end wall which comprises an integrated bearing block;
each support shaft being slidably mounted for axial displacement within a respective one of said bearing blocks to allow for the transverse separation of the wheels to be varied;
wherein one end of each support shaft is directly connected to a piston head enclosed within a respective one of said hydraulic cylinders and which applies a force to assist in varying the transverse separation of the wheels in response to an applied hydraulic signal.

15. An agricultural application machine according to claim 14, wherein the respective cylinders associated with a pair of wheels are formed and mutually aligned within a single module mounted to the chassis.

16. An agricultural application machine comprising:
a pair of wheels each having an associated wheel support structure mounted to the chassis by a transversely extending support shaft which is slidably mounted for axial displacement within a bearing block to allow for the transverse separation of the wheels to be varied; wherein the support shaft is configured to pass through the respective wheel support structures, such that in a narrow transverse wheel separation position the support shaft passes through the respective wheel support structures and extends laterally outside of the respective wheel support structures;
each wheel being mounted to a respective wheel carrier which is suspended from the associated wheel support structure by a four-bar linkage arrangement.

17. An agricultural application machine according to claim 16, further comprising for each wheel a respective height adjustment actuator connected between a point fixed relative to the chassis and the lower arm, wherein the length of the actuator is varied to adjust the height of the chassis above the ground.

18. An agricultural application machine according to claim 16, wherein each respective bearing block is fixed relative to the associated wheel support structure and the support shafts are fixed relative to the chassis.

* * * * *